March 4, 1969

JAMES E. WEBB
ADMINISTRATOR OF THE NATIONAL AERONAUTICS
AND SPACE ADMINISTRATION
HEAT FLUX SENSOR ASSEMBLY
Filed Nov. 27, 1967

3,431,149

Gerald P. Robinson
Duane E. Crofts
INVENTORS

BY *W.A. Marcontell*
*J. Mac Coy*
ATTORNEY

United States Patent Office 3,431,149
Patented Mar. 4, 1969

3,431,149
HEAT FLUX SENSOR ASSEMBLY
James E. Webb, Administrator of The National Aeronautics and Space Administration with respect to an invention of Gerald P. Robinson, High Ridge, and Duane E. Crofts, Florissant, Mo.
Filed Nov. 27, 1967, Ser. No. 685,764
U.S. Cl. 136—213
Int. Cl. H01v 1/30
9 Claims

ABSTRACT OF THE DISCLOSURE

In radiant heat flux sensors, greater thermal isolation from irrelevant and undesirable heat sources may be acquired by providing a heat conductive shield including an annular heat radiating fin between the flux sensing element and the sensor mount housing. By equating the $MC_p/A$ ratio of the heat shield with that of the sensor element and providing appropriate surface areas of both the sensing element and the radiating fin with substantially identical $$\frac{absorptivity}{emissivity}$$

ratios, the radiative heat transfer between the two parts may be substantially reduced.

---

The invention described herein was made in the performance of work under a NASA contract and is subject to the provision of Section 305 of the National Aeronautics and Space Act of 1958, Public Law 85—568 (72 Stat. 435); 42 U.S.C. 2457.

Background of the invention

This invention relates to means for the measurement of radiant heat energy. More specifically, the invention pertains to radiant heat flux sensing means and improvements thereon.

Among the several methods of quantitatively measuring radiant heat is the transient concept which relies on the measured time rate of change in temperature of a disc of material having known physical and thermal properties. By observing the change in temperature of a disc of material of known mass, physical dimensions, and thermal properties exposed to a radiant heat energy source over a measured time interval, it is possible to determine the intensity of the heat energy source. Such a determination is accomplished by calculating the heat flux emission from said energy source with the relation $$Q = \frac{MC_p}{A} \frac{d\,temp}{d\,time}$$

where:

Q=heat flux, B.t.u./ft.$^2$ sec.
M=mass of disc material, lb.
A=area of disc, ft.$^2$
$C_p$=specific heat of disc material, B.t.u./lb.–° F.

The value Q represents the quantity of heat in B.t.u.'s falling on a unit area of the sensor per second. Determination of source intensity from the heat flux value Q is dependent on particular case relationships. In the simple example of a point heat source emitting radiant energy spherically, one would merely determine the surface area of a sphere having a radius equal to the distance of the heat flux sensor from the energy source, the product of such an area and the calculated heat flux value Q yielding the total heat energy emission rate in B.t.u./sec.

The foregoing example gives no consideration to heat falling on the sensor from radiant sources other than the point heat source. Such factors as extraneous heat sources, emission geometry and angle of incidence are unique to each and every heat sensor application and account therefor must necessarily be taken to gain an accurate thermal emissive rate for any particular heat source in a system.

Prior art heat flux sensors are simply comprised of a cup or concave dish-shaped housing member to which is attached a disc-shaped detecting element made of a heat conductive material such as copper, aluminum, Inconel, nickel, gold, stainless steel, etc. The detecting element is usually attached to the housing member by means of small diameter pins brazed to the back of said detecting disc and extending radially from the periphery thereof. The outer ends of the mounting pins are cemented to the rim of the housing member. Also brazed to the back of the detecting element is a thermocouple junction with the leads therefrom extending through an aperture in the housing member to a remote, E.M.F. measuring apparatus.

Heat flux sensors such as described above have been found to give generally satisfactory performance in many applications. However, in applications where a high degree of sensitivity is required, such as a determination of the quantity of radiant heat falling on a spacecraft from celestial sources, the performance of such prior art sensors is less than satisfactory. Accurate flux measurements in such cases are obscured and vitiated by temperature differentials between the sensor detecting element and surrounding structure forming the housing member which induce undesirable energy transfers relative to the detecting element. In a spacecraft, such temperature differentials may arise from different heating rates of the surrounding structure as compared to the detecting element even though both are given identical exposure to the subject energy source. This is due to the fact that the spacecraft structure does not have the same proportion of radiant area in relation to the mass thereof to dissipate the radiant energy absorbed thereby as does the sensing element, even though the two may be fabricated of the same material and have the same ratio of specific heat, $C_p$. Hence, the heat storage capacity of the surrounding structure may be greater than that of the sensing disc in relation to their respective radiation dissipant capacities. Additionally, if the surface treatment of the structure surrounding the sensing element differs from that of the sensing element, one may absorb more than the other of the available radiant energy impinging equally on both. Furthermore, heat generated internally of the spacecraft from sources such as fuel cells and electronic equipment will migrate conductively through the spacecraft walls thereby further contributing to the temperature differential between the detecting element and its surrounding structure.

As a consequence of the heating differentials between the detecting disc and its surrounding structure, assuming the surrounding structure to be the warmer of the two, undesirable heat conducted to the sensor housing member in direct physical contact with the spacecraft structure is radiated therefrom onto the detecing element where the effect therefrom is sensed by the thermocouple.

Summary

An objective of the present invention is to substantially isolate the detecting element of a heat flux sensor from such undesirable thermal sources by providing a radiation shield between the housing member and the detecting element, and to minimize heat conductive physical contact between adjacent heat flux sensor components.

Brief description of the drawings

These and other objects of the present invention may be more readily seen and understood by reference to the following detailed description of the drawing wherein.

*Description of preferred embodiment*

Figure 1:
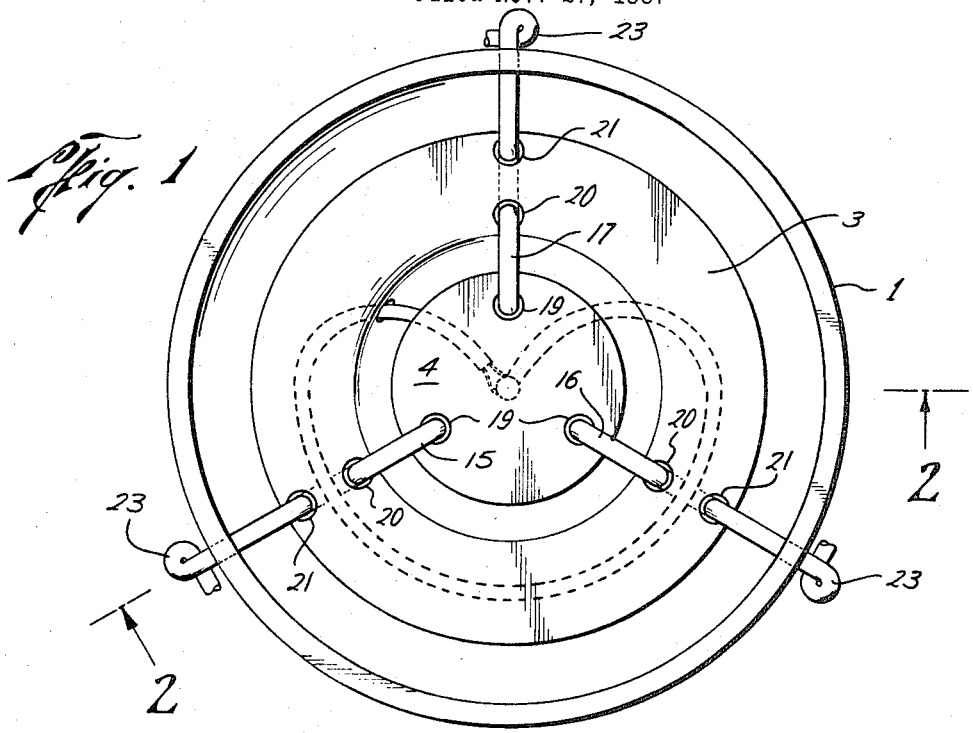
FIGURE 1 is a plan view of the assembled heat flux sensor according to the present invention.
Figure 2:
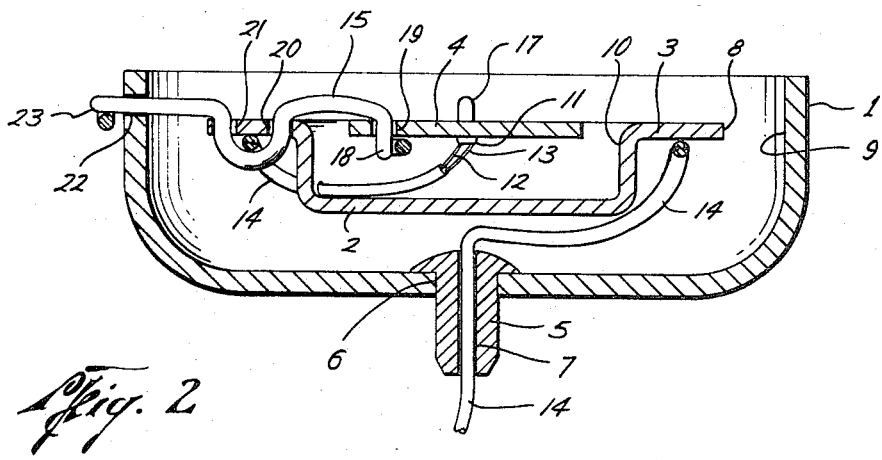
FIGURE 2 is a sectional elevation taken along cut lines A—A of FIGURE 1.

A heat flux sensor according to the present invention includes four basic components comprising a housing cup 1, a radiation shield 2, a radiator fin 3, and a detecting disc 4. Each of these components may be fabricated from thin plate copper, aluminum, etc., having a high rate of thermal conductivity.

The housing cup 1 may simply be a dish of concave shaped thin metal having a mounting lug or bolt 5 extending from the interior surface of the cup through a centrally drilled aperture 6. A thermocouple cable conduit 7 is provided axially through the mounting lug 5.

The radiation shield 2 and radiator fin 3 may be fabricated from a single, integral sheet of thin metal stock by upset forming a shallow disc 2 in the center of a circular plate leaving a wide annular flange portion 3 for the radiator fin. The diameter of the radiator fin outer periphery 8 should be slightly smaller than the diameter across the housing cup inside rim 9.

Detecting disc 4 is a circular, flat metal plate having a diameter slightly smaller than the diameter across the inside rim 10 of the shallow dish forming the radiation shield 2.

Secured in some conventional manner, by brazing, or with Dow Corning Silastic 892, for example, to the under side of the detecting disc 4 is a thermocouple junction 11 having electrically insulated conductor leads 12 and 13 emanating therefrom. Preferably, the thermocouple leads 12 and 13 are carried jointly in a ground conductive sheath as a single cable 14. In order to dissipate undesirable heat conducted along the thermocouple cable 14 from outside the heat flux sensor boundary, the cable 14 is bonded to the back side of the radiator fin 3 along a sufficient length thereof. To exit the cable 14 from the interior space between the mounting cup 1 and the radiation shield 2 to a remotely located E.M.F. measuring apparatus, the cable is threaded through the thermocouple cable conduit 7 in the mounting lug 5.

Since it is fundamental to thermally isolate the detecting disc 4, radiation shield 2, and housing cup 1, respectively, these components are relatively assembled with three or more strands of thermally non-conductive material. Such assembly strands 15, 16, and 17, respectively, are provided with a knot 18 or some other enlargement means to secure the strand on the bottom side of the detecting disc 4 while the strand length passes through an aperture 19 in said disc 4. Each of the strands are extended radially outward from the apertures 19 and are threaded through apertures 20 and 21 in the radiator fin 3 in the manner illustrated.

It is of additional significance that the radiation section comprising the radiation shield 2 and radiator fin 3 be fabricated of a material having dimensional and thermal properties such as to tailor the $MC_p/A$ and absorptivity/emissivity ($\alpha/\epsilon$) ratios of the radiator section so that the temperature profile thereof will follow that of the detecting disc 4, thereby reducing the radiative heat transfer between the two parts to substantially zero. What is meant by "temperature profile" is the shape of the curve resulting from a plot of the element (disc or radiation shield) temperature with respect to time when subjected to a standard radiant heat source. It is therefore desired that both the sensing disc 4 and the radiation shield 2 have the same temperature at any given point of time after subjection under identical conditions to a given radiant heat source in order to substantially eliminate undesirable relative heat transfer.

Such desired temperature profile results may, in part, be achieved by selecting the materials and physical dimensions of both the sensing disc 4 and the radiation section as an unit, so that the respective $MC_p/A$ ratios are substantially the same. In determining the $MC_p/A$ ratio equality, the area of the radiator section relevant to the computation is only the upper annular surface of the radiation fin 3, whereas the mass of the radiator section includes the entirety of both the fin 3 and the shield 2. In computing the $MC_p/A$ ratios of the sensing disc 4, only the upper surface area thereof is considered in the calculation.

Also contributory to the desired temperature profile result is the complementary treatment of certain assembly element surface portions in order to induce an orderly and desirable flow of undesired heat away from the sensing disc 4. Since one source of such undesirable heat is, for purposes relevant here, the structure to which the housing cup 1 is mounted, the heat flow path is via conduction through to said housing cup, radiation to the radiator section, conduction through the radiator section, and finally radiation to the sensing disc 4 where it will adversely affect the response of the thermocouple circuit. By providing those areas of the sensor assembly elements facing the sensing disc 4 with low emissive surface treatments, heat radiation in the direction of the sensing disc 4 is thereby retarded. The result of such retardation is to induce the heat to follow a conductive path of least resistance to areas of the assembly provided with highly emissive surface treatments where the heat may be radiantly dissipated away from the sensing disc. Appropriate examples of such low emissivity surface treatments are gold plating, highly polished aluminum, or highly polished copper. Such low emissivity surface treatments are provided over the inner surface of housing cup 1, the upper surface portions of the radiation shield 2 proximate of the sensing disc 4 and the interior of the cylindrical portion interconnecting the shield 2 with the fin 3.

The surface treatment provided for the lower surfaces of sensing disc 4 and radiator section 2 and 3 is one of low absorptivity in order to resist or reflect as much of the radiant heat emitted from the opposing surface as possible. Since the temperature differential between respective elements of the sensor assembly will be relatively small in view of spectral shifts in radiant energy wavelength distribution due to absolute body temperature, low emissive surface treatments as described above will function equally well as low absorbers. Therefore, the lower surfaces of the sensing disc 4 and the radiator section 2 and 3 should also be given, for example, a gold plate, highly polished aluminum or copper surface to further retard radiant heat transmission.

The cylindrical end annulus of the housing cup 1, the outer cylindrical portion of the housing cup 1 and the upper, annular surface of the radiating fin 3 are provided with highly emissive surfaces. These are the surfaces of the assembly from which the undesirable heat is dissipated away from the sensing disc 4. It will be noted that all of these surfaces have equal exposure to the primary radiant energy source subject to evaluation. Consequently, these surfaces will be subject to the same heat flux as is the sensing disc and for such reason, potentially become another source of undesirable radiant heat. In order to neutralize the undesirable heating effects of such heat flux on the said exposed housing cup and radiator section portions, these surfaces are provided with an absorptivity/emissivity ($\alpha/\epsilon$) ratio substantially the same or slightly less than that of the upper sensing disc surface. In this context, it is assumed that the absolute temperature differential between the sensor assembly and the primary radiant energy source is great so that an appreciable spectral shift in radiant energy wavelength distribution between the two is present. This condition would occur if the monitored primary source has the spectral distribution of the sun, for example. Under such circumstances, the absorptivity factor of the $\alpha/\epsilon$ ratio may be given the special characterization of "solar absorptivity," $\alpha_s$. The result of such selective $\alpha/\epsilon$ surface treatment is to give these surfaces a heat energy exchange per unit surface area the same or slightly greater than that of the sensing disc, thereby preventing a temperature differential from arising between said radiator section and sensing disc due to the subject heat flux.

Operatively, undesirable heat present in the assembly mounting structure is radiated and conducted to the housing cup 1. Only a small percentage of such heat is radiated from the inner surface of said cup to the radiator section due to the low emissivity surface treatment thereof, the majority of such heat being radiated from the highly emissive outer cylindrical surface of the cup away from the sensing disc. Of that heat absorbed by the radiator section, the majority is conductively shunted to the annular fin of the radiator 3 where it is emitted from the highly emissive upper surface thereof away from the sensing disc 4 due to the influence of the low emissive surface treatments of the remaining surfaces of the radiator section.

Consequently, of the total spurious heat transmitted to the cup 1 and the radiation section, only an extremely small percentage, if any, will be absorbed by the sensing disc 4 to undesirably influence the junction 11 temperature of the thermocouple.

Cooperatively, then, a zero temperature differential, and hence zero relative transfer, is maintained between the sensing disc 4 and the radiation section, thereby leaving the thermocouple circuit responsive only to radiant heat energy received from the hemisphere environment to which it is directed.

Obviously, many modifications and variations of the present invention are possible in the light of the above teachings. It is, therefore, to be understood that the invention may be practiced other than as specifically described.

What is claimed is:

1. Apparatus for sensing heat flux quantity from radiant energy sources:
   first means having high thermal conductivity for absorbing incident radiant flux;
   temperature sensing means secured to said first means;
   radiant heat shielding and radiating means; and
   thermal conduction barrier means spatially securing said first means in relative position to said radiant heat shielding and radiating means whereby at least a portion of said radiant heat shielding and radiating means is disposed on the side of said first means opposite from energy sources emitting radiant heat;
   the temperature profile of said shielding and radiating means being substantially matched to that of said first means whereby relative heat transfer therebetween is substantially eliminated.

2. Apparatus as described by claim 1 wherein:
   said radiant heat shielding and radiating means and said first means comprise plate members having selectively predetermined $MC_p/A$ ratios.

3. Apparatus as described by claim 1 wherein said radiant heat shielding and radiating means and said first means have surface portions having selectively predetermined absorptivity/emissivity ratios.

4. Apparatus as described by claim 1 wherein
   said radiant heat shielding and radiating means and said first means are plate members, respective $MC_p/A$ ratios of which are selectively predetermined; and
   respective surface portions of said radiant heat shielding and radiating means and said first means are provided with selectively predetermined absorptivity/emissivity ratios.

5. Apparatus as described by claim 1 including:
   concave shaped housing means having an open interior;
   said radiant heat shielding and radiating means being a thin plate member disposed within and across the concavity opening of said housing means and secured to said housing means by thermal conduction barrier means whereby no physical contact between said housing means and said plate member is allowed, said thin plate member including a centrally located dish portion having radially extending annular fin means projecting outwardly from the rim thereof, the opening of said dish portion facing said first means;
   said first means comprising thin plate means having an edge periphery geometrically shaped similar to, but slightly smaller than, said dish portion opening;
   said first means plate being disposed across said dish portion opening, whereby the outer surface of said first means plate lies in substantially the same plane as the outer surface of said annular fin.

6. Apparatus as described by claim 5 wherein:
   the annular surfaces of said annular fin means most remote from said housing means and of said first means plate most remote from said radiant heat shielding and radiating means have relatively high emissivity values and selectively matched absorptivity/emissivity ratios;
   said radiant heat shielding and radiating means and said first means having selectively matched $MC_p/A$ ratios; and,
   the surfaces of said housing means most proximate of said radiant heat shielding and radiating means and of said dish portion most proximate of said first means have relatively low emissivity values.

7. Apparatus as described by claim 6 wherein:
   the surfaces of said radiant heat shielding and radiating means most proximate of said housing means and of said first means plate most proximate of said shielding and radiating means have relatively low absorptivity values.

8. Apparatus as described by claim 5 wherein:
   said temperature sensing means is a thermocouple having junction means and dissimilar metal electrical conducting lead means emanating from said junction means, said junction means being conductively secured to the side of said first means most proximate of said radiant heat shielding and radiating means.

9. Apparatus as described by claim 8 wherein:
   said dissimilar metal lead means includes an electrically insulated portion, said insulated portion being secured in a thermally conductive manner to said radiant heat shielding and radiating means.

References Cited

UNITED STATES PATENTS

| Re. 19,564 | 5/1935 | Quereau | 136—215 |
|---|---|---|---|
| 2,627,530 | 2/1953 | Fastie | 136—214 |
| 2,921,972 | 1/1960 | Kreisler et al. | 73—190 |
| 2,938,122 | 5/1960 | Cole | 73—355 XR |
| 3,092,997 | 6/1963 | Gaskill | 73—355 |
| 3,123,996 | 3/1964 | Musial. | |
| 3,277,715 | 10/1966 | Vanderschmidt | 73—355 |

OTHER REFERENCES

Eisberg, R. M., Fundamentals of Modern Physics, Wiley, New York, copyright 1961, p. 47.

LOUIS R. PRINCE, *Primary Examiner.*

F. SHOON, *Assistant Examiner.*

U.S. Cl. X.R.

73—355